United States Patent [19]
Heidelberg et al.

[11] Patent Number: 4,686,435
[45] Date of Patent: Aug. 11, 1987

[54] ELECTROMAGNETIC LINEAR DRIVE

[76] Inventors: Götz Heidelberg, Am Hügel 16, D-8130 Starnberg-Percha; Andreas Gründl, Haseneystrasse 20, D-8000 München 70; Peter Rosner, Waltherstrasse 2, D-8000 München 2, all of Fed. Rep. of Germany

[21] Appl. No.: 647,708

[22] Filed: Sep. 5, 1984

[30] Foreign Application Priority Data

Sep. 5, 1983 [DE] Fed. Rep. of Germany ....... 3331950

[51] Int. Cl.$^4$ ............................................. H02K 41/03
[52] U.S. Cl. ...................... 318/135; 310/12; 104/292
[58] Field of Search ............... 318/37, 38, 135; 104/290-299; 310/12-14

[56] References Cited

U.S. PATENT DOCUMENTS 4,348,618  9/1982  Nakamura ................. 318/135 X
4,420,712  12/1983  Belikov et al. .............. 318/38 X

FOREIGN PATENT DOCUMENTS 2805994  12/1982  Fed. Rep. of Germany .

Primary Examiner—Donovan F. Duggan
Attorney, Agent, or Firm—Hubbard, Thurman, Turner & Tucker

[57] ABSTRACT

An electromagnetic linear drive including at least two stators divided into motor elements which constitute two paths of movement for movable vehicles in opposite directions is disclosed. An energy supply unit, including a power control unit, is associated with each of two opposed motor elements belonging to one or the other path of movement. The energy supply unit is selectively connectable to the motor element of one path of movement or to the motor element of the other path of movement, as required. When a vehicle is located above both motor elements associated with a single energy supply unit, the common energy supply unit is connected, according to a predetermined selection, to one of the two motor elements or alternated between both motor elements.

6 Claims, 1 Drawing Figure

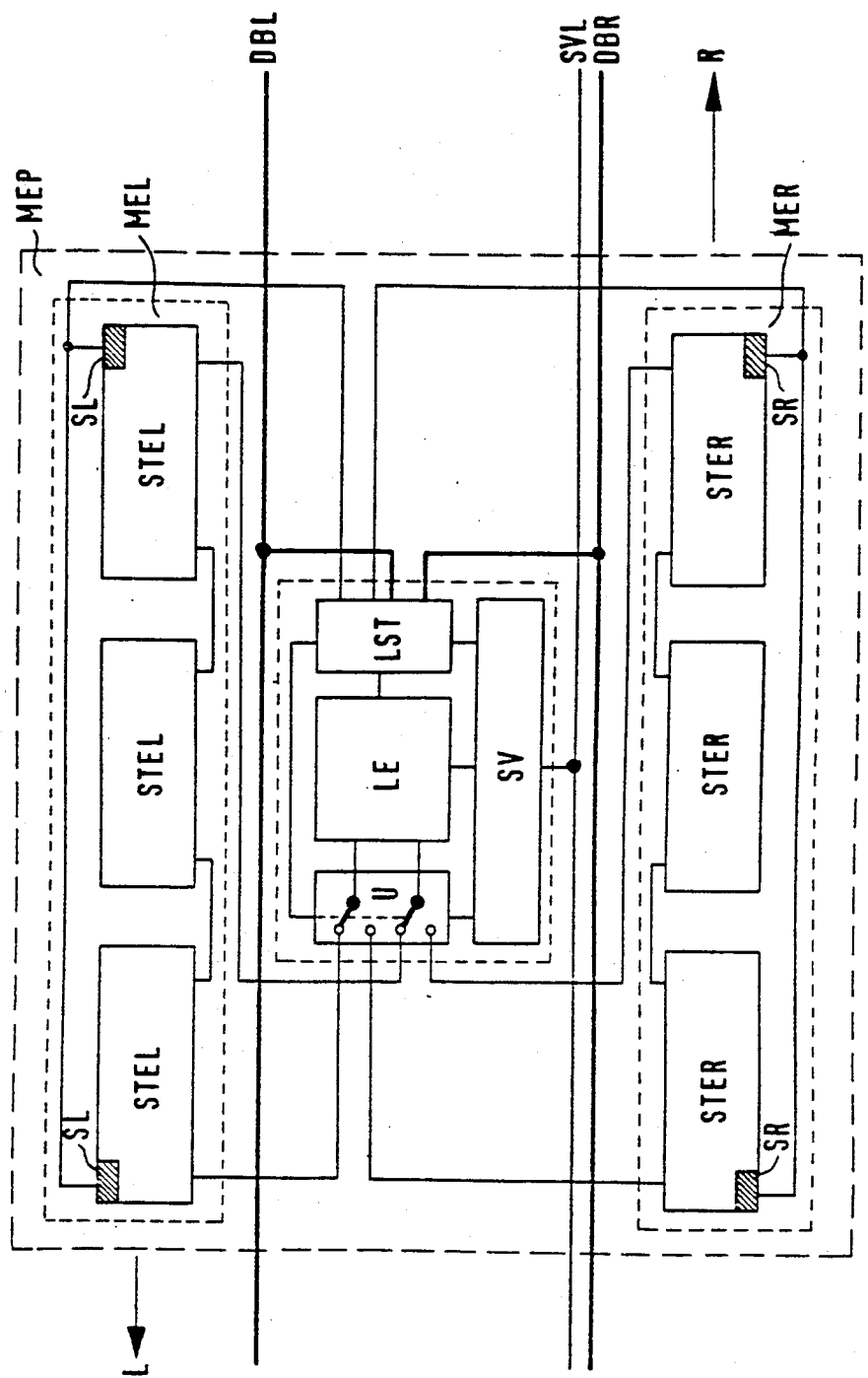

ELECTROMAGNETIC LINEAR DRIVE

BACKGROUND OF THE INVENTION

The invention relates to an electromagnetic linear drive which includes a first stator which constitutes a path of movement for a movable vehicle for a first running direction and a second stator which extends substantially parallel to the first stator and which constitutes a path of movement for a movable vehicle for the opposite direction. Each of the two stators includes current conductors or windings. Each stator is divided into a number of motor elements, and individual energy supply units adapted to be switched on and off individually are associated with the individual motor elements.

It is known in the prior art to divide the stator of an electromagnetic linear drive into a plurality of sections. A switching device is typically associated with each section to connect the current conductors of the respective section to an energy supply unit. As a result, energy need not be supplied simultaneously to all current conductors of the stator which constitutes the path of movement. If that were necessary, it would involve not only high losses in power but also require structural elements designed for high power. With known linear drive devices the individual sections of the stator are switched on and off by sensors which are disposed along the path of movement and which can be influenced by the movable vehicle. Thus the vehicle itself controls switching on and off of the individual sections of the stator.

Usually two paths of movement for opposite running directions are arranged side by side along a line.

It is an object of the invention to reduce the expenditure for components and circuitry and thus the overall cost of a magnetic transit system having paths of movement for opposite running directions disposed side by side.

This object is met, in accordance with the invention, in that each energy supply unit is associated with a motor element of one path of movement and the opposed motor element of the other path of movement and is connectable to the motor element of the one path of movement or the motor element of the other path of movement, as required. The common energy supply unit is connectable, according to a predetermined selection, to one of the two associated motor elements or alternatingly to one of the other of the two motor elements when a vehicle is located above both of the two motor elements associated with a single energy supply unit.

In this manner, half the number of energy supply units are sufficient with the present invention because a pair of opposed motor elements of the two paths of movement can be supplied by a common energy supply unit when the electromagnetic linear drive is designed in accordance with the present invention.

This design provides considerable savings in cost in view of the fact that expensive power components are generally needed for the energy supply units. This reduction to one half the number of energy supply units also permits great savings in circuitry expenditure and reduces the space necessary to house the energy supply units.

Various possibilities exist for the occasion when a vehicle is located above both motor elements belonging to one energy supply unit:

(1) One of two motor elements of a pair of motor elements associated with a common energy supply unit is selected and, in the instance described, the energy supply unit is connected to this motor element. No energy is supplied during this time to the other motor element of the pair;

(2) Both motor elements of this pair of motor elements are connected in an alternating manner to the energy supply unit;

(3) In each motor element the deviation of the actual speed from the instantaneous nominal speed is determined for the vehicle moving over the motor element. The enrgy supply unit is connected to the motor element for which a greater deviation from the nominal speed has been detected; or (4) Neither of the two motor elements of such a pair of motor elements is connected to the energy supply unit so that both motor elements will remain passive and not transmit any pushing force to vehicles moving over the same.

The solution proposed by the instant invention is especially advantageous in connection with electromagnetic linear drives of which all motor elements are designed for the same maximum performance as claimed and described in detail in co-pending U.S. patent application Ser. No. 647, 706, entitled "An Electromagnetic Linear Drive", filed of even date herewith. With such a linear drive having equal performance motor elements all the energy supply units may be designed for the same maximum performance so that identical energy supply units can be utilized along the entire running line. Furthermore, the connection of a common energy supply unit to one or the other of the two motor elements of a pair of motor elements each designed for the same maximum performance is much simpler than would be the case with a pair of motor elements having individual motor elements designed for a different maximum performance.

The solution according to the present invention is also especially advantageous for use with an electromagnetic linear drive as disclosed in co-pending U.S. patent application Ser. No. 647,705, entitled "An Electromagnetic Linear Drive", filed of even date herewith. In that case running program numbers for the individual motor elements are stored in running program memories coordinated with the individual motor elements and may be called up in correspondence with the selection from a plurality of given running characteristics for the respective running line. The common energy supply unit of a pair of motor elements then will be controlled to supply power in accordance with the respective running program number selected of one or the other motor element of a pair of motor elements, depending on which of the two motor elements the energy supply unit is connected to.

An energy supply unit comprising monophase controllers designed according to co-pending U.S. patent application Ser. No. 647,707, entitled "An Energy Supply Unit For a Multiphase Electromagnetic Linear Drive", filed of even date herewith is especially well suited for a linear drive of the type described here, regardless of whether or not it includes equal performance motor elements and/or running program control.

BRIEF DESCRIPTION OF THE DRAWINGS

The invention and further developments of the invention will be described further, by way of an embodiment, with reference to the accompanying drawing.

The sole drawing depicts a schematic diagram of the electromagnetic linear drive of the present invention.

DETAILED DESCRIPTION OF THE DRAWING

The sole drawing shows a pair of motor elements MEP including one motor element MEL and one motor element MER. The motor element MEL belongs to a stator which constitutes a path of movement for vehicles running to the left L, while motor element MER belongs to a stator which forms a path of movement for vehicles running to the right R.

The term vehicle as used herein also is utilized to include a train composed of a plurality of vehicles.

Further pairs of motor elements are connected both to the left and right end of the pair of motor elements MEP shown in the drawing.

In the case of the embodiment shown, the two motor elements MEL and MER each comprise three stator elements STEL and STER respectively. Two sensors, SL and SR respectively, preferably Hall effect sensors, are associated with these motor elements to cooperate with control magnets provided at the respective movable vehicle, such as described in DE-OS No. 30 42 497. Current conductors of the same phase of the stator elements of a motor element are connected in series and adapted to be connected to an energy supply unit LE by a changeover switch U. Although the changeover switch U is shown to include movable switching contacts, embodiments used in practice preferably include an electronic switch, particularly a semiconductor switch. In typical multiphase operating systems the changeover switch U is adapted to switch over all phases between the two motor elements. The changeover switch U serves to connect the energy supply unit LE either to the left motor element MEL or to the right motor element MER.

Control of the switching on and off of the energy supply unit LE and of the intensity of the power supplied by the energy supply unit LE is effected by a power control unit LST to which the energy supply unit LE is connected. In the embodiment shown, the power control unit LST also effects the switchover of the changeover swtich U. The power control unit comprises two pairs of inputs, one pair being connected to sensors SL and SR respectively, of the two motor elements MEL and MER. The other pair of inputs is connected to a left data bus DEL and a right data bus DER respectively. Because of the connections to sensors SL and SR, power control unit LST is provided with the information that a vehicle has entered the space above a motor element and with information on the actual speed of this vehicle. The data bus lines DEL and DBR supply the power control unit LST with running program information, for example, the running program number for the motor elements required for a certain selected running characteristic.

A current supply source SV connected to a mains SVL provides power for the changeover switch, the energy supply unit LE and the power control unit LST.

The novel linear drive operates as follows with regard to the connecting of the power supply units LE:

When a vehicle running to the right R, for instance, enters the space above motor element MER, the sensor SR shown at the bottom on the left side of the drawing transmits this information to the power control unit LST. The power control unit LST then causes the energy supply unit LE to be switched on and to have its output connected by the changeover switch U to the motor element MER. The intensity of the power transmitted to the motor element MER depends on the nominal speed desired to be attained and is controlled by means of the power control unit LST in response to the information on the data bus DBR for movement in the direction to the right. With the running program number control mentioned above, the energy supplied by the energy supply unit LE depends on the respective running program number for movement to the right, as selected in this instance in the memory for movement to the right R associated with the power control unit LST.

When the vehicle leaves the space above motor element MER this fact is determined by a sensor SR shown at the bottom at the right side of the figure. This sensor causes the power control unit LST to switch off the energy supply unit LE. As a single motor element normally is short in length as compared to the length of a vehicle or train moving over the same, the motor element receives power only during the time during which it must impart thrust to the vehicle.

If a vehicle enters the space above both motor elements MEL and MER of the pair of motor elements MEP at the same time, this fact is reported by sensor SL and SR to the power control unit LST and the energy supply unit LE is connected to one of the two motor elements MEL or MER by means of the changeover switch U, the connection either being exclusive or alternating. If a connection is established exclusively to one of the two motor elements MEL and MER, this fact may be predetermined from the beginning. If the distance to be covered is included for instance, the motor element belonging to the rising path of movement will be the one to be connected to the energy supply unit LE. As an alternative, it is possible always to connect that motor element to the energy supply unit LE at which the greater deviation of the actual speed from the nominal speed is determined when the vehicle moves over this motor element.

The drawing shows only one row of stationary elements per path of movement. In reality, however, preferably two rows of stationary elements disposed side by side are provided per path of movement. This is not shown in the drawing for the sake of simplicity.

What is claimed is:

1. An electromagnetic linear drive including:
  a first stator which constitutes a path of movement for a first running direction and a second stator which extends substantially parallel to the first stator and constitutes a path of movement for the opposite running direction, each of the two stators being provided with current conductors, and also including a first movable part which constitutes a first vehicle associated with the first stator, and a second movable part which constitutes a second vehicle associated with the second stator, each stator being divided into a number of motor elements and individual energy supply units the individual supply units being adapted to be switched on and off individually and associated with the individual motor elements, and each energy supply unit being associated with a motor element of the one path of movement and the opposed motor element (MER) of the other path of movement and being connectable to the motor element of the one path of movement or the motor element (MER) of the other path of movement, as required wherein the improvement comprises a changeover switching means connected to the common energy supply unit for alternating the power of the common energy supply unit between the two motor elements when vehicles are simultaneously above the two motor elements connected in common to the energy supply unit.

2. An electromagnetic linear drive including:

a first stator which constitutes a path of movement for a first running direction and a second stator which extends substantially parallel to the first stator and constitutes a path of movement for the opposite running direction, each of the two stators being provided with current conductors, and also including a first movable part which constitutes a first vehicle associated with the first stator, and a second movable part which constitutes a second vehicle associated with the second stator, each stator being divided into a number of motor elements and individual energy supply units the individual supply units being adapted to be switched on and off individually and associated with the individual motor elements, and each energy supply unit being associated with a motor element of the one path of movement and the opposed motor element (MER) of the other path of movement and being connectable to the motor element of the one path of movement or the motor element (MER) of the other path of movement, as required wherein when a vehicle is present above each of the two motor elements connected to the common energy supply unit, a switching means attached to the common energy supply unit energizes only that one of the two motor elements which shows the greater speed deviation of the associated vehicle from the nominal speed.

3. The electromagnetic linear drive according to claim 2, further including a nominal speed/actual speed comparator connected to each motor element to determine the deviation of the actual speed of the associated vehicle from the nominal speed thereof, and a deviation comparator connected to each energy supply unit to compare the speed deviations of the two motor elments connected thereto and wherein the changeover switching means connected to each energy supply unit control is for the switching on of the motor element having the greater speed deviation when a vehicle is present above each of the two motor elements having a common energy supply unit.

4. An electromagnetic linear drive including:

a first stator which constitutes a path of movement for a first running direction and a second stator which extends substantially parallel to the first stator and constitutes a path of movement for the opposite running direction, each of the two stators being provided with current conductors, and also including a first movable part which constitutes a first vehicle associated with the first stator, and a second movable part which constitutes a second vehicle associated with the second stator, each stator being divided into a number of motor elements and individual energy supply units the individual supply units being adapted to be switched on and off individually and associated with the individual motor elements, and each energy supply unit being associated with a motor element of the one path of movement and the opposed motor element (MER) of the other path of movement and being connectable to the motor element of the one path of movement or the motor element (MER) of the other path of movement, as required wherein when a vehicle is present above each of the two motor elements connected to a common energy supply unit, a switching means connected to the common energy supply unit connects the common energy supply unit only to a predetermined one of the two motor elements and the second motor element remains without supply.

5. An electromagnetic linear drive including:

a first stator which constitutes a path of movement for a first running direction and a second stator which extends substantially parallel to the first stator and constitutes a path of movement for the opposite running direction, each of the two stators being provided with current conductors, and also including a first movable part which constitutes a first vehicle associated with the first stator, and a second movable part which constitutes a second vehicle associated with the second stator, each stator being divided into a number of motor elements and individual energy supply units the individual supply units being adapted to be switched on and off individually and associated with the individual motor elements, and each energy supply unit being associated with a motor element of the one path of movement and the opposed motor element (MER) of the other path of movement and being connectable to the motor element of the one path of movement or the motor element (MER) of the other path of movement, as required wherein when a vehicle each is present above the two motor elements connected to a common energy supply unit, a switching means connected to the common energy supply unit disconnects the common energy supply unit from the two motor elements.

6. The electromagnetic linear drive according to claims 1, 2, 4, or 5 wherein the two motor elements associated with the common energy supply unit are designed for equal maximum performance.

* * * * *